United States Patent
Wright

(10) Patent No.: US 9,068,092 B2
(45) Date of Patent: Jun. 30, 2015

(54) PROCESS FOR PREPARING POLYMERS, POLYMERS, DISPERSIONS, INKS AND USES

(75) Inventor: Gavin Wright, Manchester (GB)

(73) Assignee: Fujifilm Imaging Colorants Limited (GB)

(*) Notice: Subject to any disclaimer, the term of this patent is extended or adjusted under 35 U.S.C. 154(b) by 0 days.

(21) Appl. No.: 14/130,960

(22) PCT Filed: Jul. 2, 2012

(86) PCT No.: PCT/GB2012/051544
§ 371 (c)(1),
(2), (4) Date: Mar. 14, 2014

(87) PCT Pub. No.: WO2013/005021
PCT Pub. Date: Jan. 10, 2013

(65) Prior Publication Data
US 2014/0267513 A1    Sep. 18, 2014

(30) Foreign Application Priority Data
Jul. 7, 2011   (GB) ................................. 1111585.4

(51) Int. Cl.
| | | |
|---|---|---|
| C09D 11/30 | (2014.01) | |
| C08G 18/08 | (2006.01) | |
| C08G 18/32 | (2006.01) | |
| C08G 18/34 | (2006.01) | |
| C08G 18/38 | (2006.01) | |
| C08G 18/75 | (2006.01) | |
| C09D 11/102 | (2014.01) | |
| C09D 11/326 | (2014.01) | |
| B41J 2/175 | (2006.01) | |

(52) U.S. Cl.
CPC ............ *C09D 11/30* (2013.01); *C08G 18/0823* (2013.01); *C08G 18/3206* (2013.01); *C08G 18/348* (2013.01); *C08G 18/3851* (2013.01); *C08G 18/755* (2013.01); *C09D 11/102* (2013.01); *C09D 11/326* (2013.01); *B41J 2/17503* (2013.01)

(58) Field of Classification Search
CPC .. C09D 11/102; C09D 11/326; B41J 2/17503
USPC ...................... 523/160, 161; 347/86
See application file for complete search history.

(56) References Cited

U.S. PATENT DOCUMENTS

| 3,573,301 A | 3/1971 | Winter |
| 3,622,339 A | 11/1971 | Nishio et al. |
| 4,125,413 A | 11/1978 | Davies et al. |
| 4,314,001 A | 2/1982 | Wesseler |
| 4,562,246 A | 12/1985 | Wang et al. |
| 4,812,492 A | 3/1989 | Eckes et al. |
| 5,051,464 A | 9/1991 | Johnson et al. |
| 5,200,445 A | 4/1993 | Cipolli et al. |
| 5,240,499 A | 8/1993 | Az et al. |
| 5,534,573 A | 7/1996 | Leake |
| 5,969,002 A | 10/1999 | Kijlstra et al. |
| 6,034,154 A | 3/2000 | Kase et al. |
| 6,136,890 A | 10/2000 | Carlson et al. |
| 6,316,619 B1 | 11/2001 | Miyake et al. |
| 7,524,892 B2 | 4/2009 | Kataoka et al. |
| 7,858,676 B2 | 12/2010 | Waki et al. |

(Continued)

FOREIGN PATENT DOCUMENTS

| EP | 0018099 A2 | 10/1980 |
| JP | 2004-175861 A | 6/2004 |
| JP | 2004-315716 A | 11/2004 |
| JP | 2008-266595 A | 11/2008 |
| JP | 2008-295837 A | 12/2008 |
| WO | WO 2009/013459 | * 1/2009 |

OTHER PUBLICATIONS

Database WPI Week 200482, Thomson Scientific, London, GB; An 2004-825169.

*Primary Examiner* — Doris Lee
(74) *Attorney, Agent, or Firm* — Banner & Witcoff, Ltd.

(57) ABSTRACT

A process for preparing a polymer comprising reacting at least the components i) to iii) in any order: i) a compound of the Formula (1): Formula (1) wherein: $T^1$ and $T^2$ independently are HO—, HS— or $R^1$HN—; $Q^1$ and $Q^2$ independently are —$NR^2$—; $A^1$ and $A^2$ independently are an optionally substituted divalent organic linking group; $R^1$ when present is H or an optionally substituted alkyl, aryl or heterocyclyl group; $R^2$ is H or an optionally substituted alkyl, aryl or heterocyclyl group; Z is an HO— group or a group of the Formula (2) or (3); Formula (2) wherein: L is —HN—, —O— or —S—; X is an optionally substituted organic group; Formula (3) wherein: each X independently is an optionally substituted organic group; in both Formulae (2) and (3) the asterisk (*) signifies the point of attachment to the triazine ring: ii) a diisocyanate; iii) an isocyanate reactive compound having at least one ionic group.

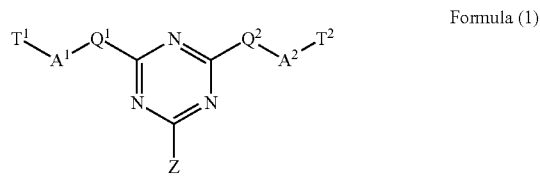

Formula (1)

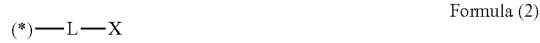

Formula (2)

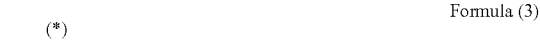

Formula (3)

22 Claims, No Drawings

(56) References Cited

U.S. PATENT DOCUMENTS

| | | | |
|---|---|---|---|
| 8,845,086 B2 * | 9/2014 | Tallant et al. | 347/100 |
| 2004/0260013 A1 | 12/2004 | Richards | |
| 2005/0017285 A1 | 1/2005 | Tzeng et al. | |
| 2008/0002004 A1 | 1/2008 | O'Donnell et al. | |
| 2011/0060102 A1 | 3/2011 | Li et al. | |
| 2011/0169900 A1 | 7/2011 | Annable et al. | |
| 2014/0168333 A1 * | 6/2014 | Wright | 347/100 |
| 2014/0309364 A1 * | 10/2014 | Wright | 524/590 |

\* cited by examiner

PROCESS FOR PREPARING POLYMERS, POLYMERS, DISPERSIONS, INKS AND USES

RELATED APPLICATION DATA

This application is a National Stage Application under 35 U.S.C. 371 of co-pending PCT application PCT/GB2012/051544 designating the United States and filed Jul. 2, 2012; which claims the benefit of GB application number 1111585.4 and filed Jul. 7, 2011 each of which are hereby incorporated by reference in their entireties.

TECHNICAL FIELD

This invention relates to a process for preparing polymers containing triazine groups, it further relates to the polymers themselves. It relates to dispersions and inks (especially ink jet printing inks) containing said polymers. It also relates to the use of the polymers for dispersing or comminuting (e.g. milling) a particulate solid so as to form a liquid dispersion.

BACKGROUND

Inks are often of one of two types, depending on the type of colorant used. Dye-based inks often comprise a dye dissolved in a liquid medium. Pigment inks comprise a pigment dispersed in a particulate form in a liquid medium. Pigment inks tend to have better ozone-fastness and light-fastness than dye-based inks. However, because the pigment is in the form of fine particles there is a tendency for the particles to agglomerate or flocculate whilst the ink is being stored and/or whilst the ink is being used (e.g. printed). Such agglomeration or flocculation before the ink has been printed onto a substrate is highly undesirable, particularly in ink jet printing inks where the printer nozzles are very small and are susceptible to blockage by any oversized particulate matter. Thus, in the ink jet field a great deal of effort has been directed towards attempting to provide sub micron sized pigment dispersions and increase the colloidal stability of these pigment dispersions.

It is also desirable to provide pigment inks which offer high optical density (OD), especially when printed onto plain paper.

Pigment dispersions are often colloidally stabilised by means of a dispersant.

In our own studies on dispersant stabilised pigment inks we have found that it is particularly difficult to prepare inks which simultaneously exhibit good colloidal stability and high OD on plain paper. For example, we have found that dispersant stabilised pigment inks known in the art having a high colloidal stability provide a low OD when printed on to plain paper and vice versa.

We have also found that the few dispersant stabilised pigment inks which do provide inks exhibiting high OD when printed onto plain paper tend to also use dispersants which require significant and undesirably high amounts of organic solvent to assist in dissolving/dispersing the dispersant, for example in the pigment dispersion or comminution step.

Further, it is desirable that a dispersant is effective in the dispersion or comminution process. Quicker comminution (e.g. milling) to submicron particles sizes saves substantial energy and it may also result in less pigment particles having a particles size markedly smaller than the target size. Particles much below the target size are often referred to as fines.

Pigment based inks when printed onto a substrate often produce final images that are not firmly secured to the substrate surface. Prints from pigment based inks often exhibit poor rub fastness, water-fastness or highlighter smear fastness.

Aqueous inks and ink jet printing inks require very different polymers as dispersant from organic inks. The present invention also aims to provide polymers suitable as dispersants for particulate solids in aqueous liquid vehicles. In addition the present invention attempts to provide polymers which can colloidally stabilise dispersions of particulate solids even when large amounts of organic liquid are present in combination with water.

Commercially, there still remains a need for dispersants which can be used to prepare pigment inks and which solve, at least in part, one or more of the abovementioned problems.

PRIOR ART

Japanese patent publication JP2004-315716 discloses polymers containing triazine rings which are useful as dispersants. This patent publication does not mention introducing ionic groups nor does it provide a disclosure of a process by which ionic groups could be incorporated.

DETAILED DESCRIPTION

According to a first aspect of the present invention there is provided a process for preparing a polymer comprising reacting at least the components i) to iii) in any order:
i) a compound of the Formula (1):

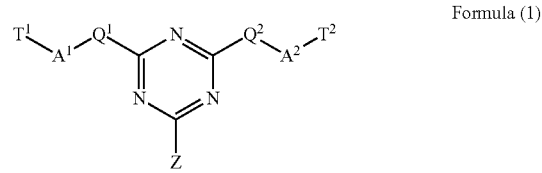

Formula (1)

wherein:
 $T^1$ and $T^2$ independently are HO—, HS— or $R^1$HN—;
 $Q^1$ and $Q^2$ independently are —$NR^2$—;
 $A^1$ and $A^2$ independently are an optionally substituted divalent organic linking group;
 $R^1$ when present is H or an optionally substituted alkyl, aryl or heterocyclyl group;
 $R^2$ is H or an optionally substituted alkyl, aryl or heterocyclyl group;
 Z is an HO— group or a group of the Formula (2) or (3);

(*)-L-X     Formula (2)

wherein:
 L is —HN—, —O— or —S—;
 X is an optionally substituted organic group;

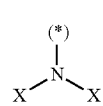

Formula (3)

wherein:
 each X independently is an optionally substituted organic group;
 in both Formulae (2) and (3) the asterisk (*) signifies the point of attachment to the triazine ring:
ii) a diisocyanate;
iii) an isocyanate reactive compound having at least one ionic group.

DEFINITIONS

Unless stated to the contrary, in the present patent the words "a" and "an" are meant to include the possibility of using one or more of that item. Thus, a compound of Formula (1) means one or more compounds of Formula (1). Similarly, a diisocyanate means one or more diisocyanates.

Isomers

Whilst the compounds as described in the first aspect of the present invention have been drawn in one structural formula the compounds and the scope of the claims are also intended to cover several isomers thereof including for example: tautomers, optical isomers, isotopic isomers etc.

Compound of Formula (1)

Preferably, the compound of Formula (1) has no ionic groups. This helps to prevent gelation, or branching and allows the preparation of the polymer having a linear structure. Preferably, the only hydroxyl, thiol or amine groups present in the compound of Formula (1) are those possible from the $T^1$ and $T^2$ groups.

$T^1$ and $T^2$

Preferably, $T^1$ and $T^2$ are each independently HO— or $R^1$HN—, more preferably $T^1$ and $T^2$ are HO—. Accordingly, it is preferred that the compound of Formula (1) is a diamine or a diol, more preferably a diol. When $T^1$ and $T^2$ are both HO— the final polymers are of course polyurethanes.

When $T^1$ and/or $T^2$ is $HNR^1$— it is preferred that the reactivity of this group is relatively low towards halo triazines when compared to amine groups in general. One way of achieving the desired lower reactivity is use primary amines wherein $R^1$ is H. In such a case it is desirable that $R^2$ is not H but is selected from optionally substituted alkyl, aryl or heterocyclyl groups.

$R^1$ and $R^2$

When an $R^1$ or $R^2$ group is an optionally substituted alkyl group, it is preferably optionally substituted $C_{1-20}$ alkyl.

When an $R^1$ or $R^2$ group is an optionally substituted aryl group it is preferably an optionally substituted phenyl or naphthyl group.

When an $R^1$ or $R^2$ group is an optionally substituted heterocyclyl it may be aromatic (heteroaryl) or non aromatic. When $R^1$ or $R^2$ is heterocyclyl it is preferably a 5- or 6-membered ring containing from 1 to 3 atoms selected from N, S and O in the ring. The remaining atoms being carbon atoms. Preferred examples of which include optionally substituted pyrrolyl, thiophenyl, furanyl, pyridyl, pyrimidyl, pyrazinyl, triazinyl, imidazolyl, thiazolyl, oxazolyl and pyrazolyl.

Preferably, $R^2$ is H. This is especially so when $T^1$ and $T^2$ are both HO—.

Optional Substituents

When $R^1$ or $R^2$ is not H, the optional substituents for $R^1$ or $R^2$ preferably independently include —$NO_2$, CN, halo (especially Cl, F, Br and I), —NHC(O)$C_{1-6}$alkyl, —$SO_2$NH $C_{1-6}$alkyl, —$SO_2C_{1-6}$alkyl, —$C_{1-6}$alkyl, —$OC_{1-6}$alkyl, —OC(O)$C_{1-6}$alkyl, polypropyleneoxide ending in a $C_{1-6}$alkyl group, polyethyleneoxide ending in a $C_{1-6}$ alkyl group. It is preferred that all the $R^1$ and $R^2$ groups have no ionic, thiol, amine, hydrazo ($H_2NNH$—) or hydroxyl (HO—) groups. We have found that the presence of such groups in the $R^1$ and $R^2$ position tends to promote unwanted gelation in the subsequent reaction with the diisocyanate in component ii).

The optional substituents for $R^1$ and $R^2$ may also be used as optional substituents for any other group which mentions the possibility of being optionally substituted. Thus for example these groups may be substituents on $A^1$ and $A^2$ groups or for that matter X groups.

Each $R^2$ group is preferably independently a H or $C_{1-6}$ alkyl group, more preferably all the $R^2$ groups are H. When all the $R^2$ groups are H this means the compound of Formula (1) may be prepared from compounds which have a primary amine group. We have found that the primary amines allow particularly effective reaction with halo triazines so as to prepare the compound of Formula (1) in good yield and purity.

$A^1$ and $A^2$

The groups $A^1$ and $A^2$ may be any optionally substituted divalent organic linking group.

$A^1$ and $A^2$ may be an alkylene, a cycloalkylene, arylene, or heterocyclylene group which may be optionally interrupted by other groups. Of these alkylene groups are preferred. The heterocyclylene groups may be aromatic or non-aromatic. The groups $A^1$ and $A^2$ may be combinations of alkylene, arylene and heterocyclylene groups. The groups $A^1$ and $A^2$ may be interrupted by groups such as —O—, —S—, —$CO_2$—, —NHCO—, —$SO_2$— and —$NHSO_2$—. Preferably $A^1$ and $A^2$ are each independently an arylene, an alkylene or a combination thereof. $A^1$ and $A^2$ may be optionally substituted with one of more or the optional substituents as mentioned for $R^1$ and $R^2$. In some embodiments $A^1$ and/or $A^2$ is/are unsubstituted.

Preferably both the groups $A^1$ and $A^2$ have no ionic, amine, hydrazo ($HN_2NH$—), thiol or hydroxyl groups. This helps to prevent any gelation in the subsequent reaction with the diisocyanate in component ii).

When $A^1$ or $A^2$ is arylene it is preferably divalent naphthylene or phenylene. When $A^1$ is phenylene the linking groups to $T^1$ and $Q^1$ may be arranged in an ortho, meta or more preferably a para position. The same is preferred for $A^2$ wherein the linking groups are now $T^2$ and $Q^2$.

When $A^1$ or $A^2$ is an alkylene group it is preferably a $C_{1-30}$ alkylene, especially a $C_{1-20}$ alkylene and most especially a $C_{2-8}$ alkylene. The alkylene groups may be branched or linear. Preferred examples are —$(CH_2)_{1-20}$— groups, examples of which are $(CH_2)_2$, $(CH_2)_3$, $(CH_2)_4$, $(CH_2)_6$ and $(CH_2)_8$.

$A^1$ and $A^2$ may be a xylylene group (—$CH_2$-phenylene-$CH_2$—), in which the $CH_2$ groups may be ortho, meta or para with respect to the phenylene ring.

In view of the foregoing, preferably $A^1$ and $A^2$ are independently selected from $C_{1-30}$ alkylene, a phenylene, a naphthylene and a xylylene group each of which may be optionally substituted. More preferably $A^1$ and $A^2$ are independently selected from optionally substituted $C_{1-30}$ alkylene groups, preferred examples of which are mentioned above.

Preferred specific examples of $A^1$ and $A^2$ groups are *$CH_2CH_2$*, *$CH_2CH$*$CH_3$, *$CH_2CH$*$CH_2CH_3$ and ortho, para and meta-phenylene wherein the asterisk marks the point of attachment of the groups in the compound of Formula (1).

The groups $A^1$ and $A^2$ may be different but more preferably they are the same.

Z

Preferably Z is of the Formula (2) or (3).

In the compounds of Formula (2) it is preferred that L is —HN— or —O—, more preferably —HN—.

The optionally substituted organic group X in the Compounds of Formula (2) and (3) may be of any kind without limitation. The organic group may by alkyl, aryl, heterocyclyl or a mixture thereof.

When an X group is an optionally substituted alkyl group, it is preferably optionally substituted $C_{1-20}$ alkyl.

When an X group is an optionally substituted aryl group it is preferably an optionally substituted phenyl or naphthyl group.

When an X group is an optionally substituted heterocyclyl it may be aromatic (heteroaryl) or non aromatic. When X is heterocyclyl it is preferably a 5- or 6-membered ring containing from 1 to 3 atoms selected from N, S and O in the ring. The remaining atoms being carbon atoms.

Preferred examples of which include optionally substituted pyrrolyl, thiophenyl, furanyl, pyridyl, pyrimidyl, pyrazinyl, triazinyl, imidazolyl, thiazolyl, oxazolyl and pyrazolyl.

The optional substituents may be any of those previously mentioned for $R^1$ and $R^2$ groups.

Whilst it is possible that the group of Formula (2) or (3) has ionic groups it is preferred that such groups are not present. The absence of these groups helps to prevent unwanted branching and gelation of the final polymer. For similar reasons preferably, the optional substituent on all X groups are not an amine, thiol, hydrazo ($NH_2NH-$) or hydroxl groups.

More than one compound of Formula (1) may be present in component i).

Preparation of the Compounds of Formula (1)

The compounds of Formula (1) are preferably prepared in two stages:

Stage 1

The first stage preferably comprises reacting $T^1A^1Q^1H$ and $T^2A^2Q^2H$ with a trihalo-triazine wherein $T^1$, $A^1$, $Q^1$ and $T^2$, $A^2$ and $Q^2$ are as herein before descried and preferred.

Of course, in some cases $T^1A^1Q^1H$ and $T^2A^2Q^2H$ may be the same compound.

As mentioned $T^1$ and $T^2$ are preferably both —OH. Thus for preferred compounds of the Formulae (1) $T^1A^1Q^1H$ and $T^2A^2Q^2H$ are monoamino-monoalcohols.

Especially preferred examples are ethanolamine (HO—$CH_2CH_2$—$NH_2$), $CH_3CH(OH)CH_2NH_2$, $CH_3CH_2CH(OH)CH_2NH_2$, and HO-phenylene-$NH_2$ and $HOCH_2$-phenylene-$CH_2$—$NH_2$. Other suitable examples of monoamino-monoalcohols include 3-amino propanol, 4-amino butanol, 2-amino-2-methyl-1-propanol, 5-amino pentanol, 6-amino hexanol and 8-amino octanol.

The corresponding monoamino-monothiols may also be used.

The halo groups in the trihalo-triazine may be I, Br, Cl or F but are preferably chlorine and thus the preferred trihalo-triazine is cyanuric chloride.

The reaction in stage 1 is preferably performed whilst maintaining moderate to low temperatures. Preferably the trihalo-triazine is suspended in a liquid medium at a temperature of less than 10° C., preferably from −5° C. to 5° C.

It is then preferred to add the compounds of Formulae $T^1A^1Q^1H$ and $T^2A^2Q^2H$ to the trihalo-triazine to form a reaction mixture. On completion of this addition it is preferred to heat the reaction mixture to 30 to 50° C., more preferably 40 to 45° C. This temperature is preferably maintained for a period of 1 to 10 hours, more preferably 2 to 4 hours and especially about 3 hours. The pH for the reaction is preferably from 5 to 9, more preferably from 6 to 7. Any suitable base may be used to obtain this pH. Preferred bases are alkali metal hydroxides, especially sodium hydroxide. Preferably, the reaction is completed by raising the temperature to from 50 to 80° C., more preferably from 50 to 70° C. and especially to around 60° C. Preferably the raised temperature is maintained for a period of 1 to 5, more preferably from 1 to 3 hours and especially about 2 hours.

Preferably, the molar amounts of $T^1A^1Q^1H$ and $T^2A^2Q^2H$ and trihalo-triazine correspond approximately to the theoretical structure (i.e. 1 mole: 1 mole: 1 mole).

The reaction is preferably carried out in a liquid medium which is preferably aqueous, more preferably comprises of water and no other liquid. Organic liquids may also be used, alone or in combination with water. Suitable examples of organic liquids include N-methyl pyrrolidone and sulfolane.

Stage 2

In stage 2 the product of stage 1 can be reacted in a number of ways.

When the compound of Formula (1) has a Z group which is an HO— group the remaining halo group attached to the triazine ring after stage 1 may be hydrolysed. This is preferably performed in an aqueous liquid medium. Preferably an acid or a base is used to accelerate the hydrolysis. Heating to an elevated temperature of between 60° C. to 90° C. is often used to accelerate the hydrolysis. As mentioned before it is more preferred that Z is of the Formula (2) or (3).

When Z is of the Formula (2) the product of stage 1 is preferably reacted with a compound of the Formula HLX wherein L and X are as previously defined and preferred. Preferred compounds of the Formula HLX include alkyl, aryl and heterocyclyl mono alcohols, mono thiols and especially mono amines. Examples of suitable amines include $C_{2-30}$, especially $C_{3-30}$ and particularly $C_{4-20}$ alkyl mono-amines. These may be branched or linear. Other suitable amines include aromatic amines such as aniline, toluidine and trimethyl aniline.

Equally, when Z is of the Formula (3) the product of stage 1 is preferably reacted with a compound of the Formula $HN(X)_2$. Preferred examples of suitable compounds of the Formula $HN(X)_2$ include di-alkyl amines especially $C_{2-30}$ and more especially $C_{2-20}$ dialkyl amines. For di-alkyl amines the $C_{2-30}$ or $C_{2-20}$ preference relates to the number of carbon atoms in each alkyl chain. Thus, in total a $C_{2-20}$ dialkyl amine has from 4 to 40 carbon atoms. The alkyl chains may be linear or branched. Aromatic diamines such as diphenylamine may also be used.

The reaction of the compounds of Formula $HN(X)_2$ or HLX with trihalo triazine are preferably performed at a temperature of from 40 to 100, especially from 50 to 90 and most especially from 60 to 80° C. The time for the reaction is preferably from 1 to 16 hours, more preferably from 2 to 16 hours and especially from 4 to 12 hours.

The reactions are also preferably performed at a pH of from 7 to 12 and most preferably at a pH of between 9 to 11.

The above reaction may prepare a single compound of Formula (1) or a number of different compounds having the Formula (1). For example it is possible to use mixtures of compounds of the Formula HLX and $HN(X)_2$ or mixtures of two different compounds of the Formula HLX.

The compounds of Formula (1) may be used directly however it is often preferable to purify the compound of Formula (1). The compound of Formula (1) may be isolated on a filter and washed with pure liquid medium. The compound of Formula (1) may be ultrafiltered using a membrane purification process.

It is sometimes useful to isolate the compound of Formula (1) in a dry form. Preferred drying methods include vacuum drying, oven drying, spray drying and the like.

Diisocyanate

The diisocyanate may be of any kind without any particular limitations. The diisocyanate may be aliphatic, aromatic or a mixture of both. Mixtures of diisocyanates may be used. Preferably, the diisocyanate has no ionic, amino, hydrazo ($NH_2NH-$), thiol or hydroxyl groups. This helps to prevent gelation or branching.

Preferred examples of suitable diisocyanates include ethylene diisocyanate, 1,6-hexamethylene diisocyanate, tetramethylxylene diisocyanate, 1,4-phenylene diisocyanate, 2,4-toluene diisocyanate, 2,6-toluene diisocyanate, 4,4'-diphenyl-methane diisocyanate and its hydrogenated derivative, 2,4'-diphenylmethane diisocyanate and its hydrogenated derivative, 1,5-naphthylene diisocyanate and isophorone diisocyanate. Of these isophorone diisocyanate is especially preferred.

It is possible, though not preferable to prepare the polymer by reacting components i), ii) and iii) along with some isocyanates having three or more isocyanate groups and/or some isocyanates having just one isocyanate group. If such isocyanates are used they are preferably only present in minor proportions (e.g. less than 5 wt % of all isocyanates present). More preferably, the only isocyanates used in the preparation of the polymer are diisocyanates.

Component iii)

Component iii) is an isocyanate reactive compound having at least one ionic group.

Of course, as used herein the term isocyanate reactive compound in component iii) means isocyanate reactive compounds other than those of Formula (1).

Preferred examples of isocyanate reactive compounds are those having hydroxyl, thiol, amino and hydrazo ($HN_2$—NH—) groups (as isocyanate reactive groups). Preferably, the isocyanate reactive compound has only two groups selected from hydroxyl, thiol, amino and hydrazo groups. In this way the isocyanate reactive compounds assist in producing a linear polymer.

The isocyanate reactive compounds in component iii) have at least one ionic group. The ionic group may be cationic or more preferably anionic.

Examples of cationic groups include quaternary amine, pyrridinium, guanide and biguanide groups. These may be in the free base or salt form or a mixture thereof. Suitable salt forms include the sulphate, nitrate, halide and carboxylate salts.

Preferred anionic groups are sulfonic acid, carboxylic acid and phosphorus containing acid groups. Of these carboxylic acid and phosphorus containing acid groups are preferred. Carboxylic acid groups prove to be especially suitable. Preferred examples of phosphorus containing acids are phosphoric and especially phosphonic acid groups. In our studies we have found that the phosphorus containing acid groups tend to promote particularly good optical density when inks utilising dispersions of pigments stabilised by the polymers prepared in the present invention are printed onto substrates such as plain paper.

The anionic groups may be in the form of the free acid, they may be in the form of a salt or a mixture thereof. Preferably, prior to and during the preparation of the polymer the anionic groups are in the acid form. Salt forms include those with ammonium, organic ammonium and hydroxyl functional organic ammonium especially alkali metal counter ions. Suitable alkali metals include potassium, sodium and lithium.

Preferred examples of isocyanate reactive compounds having at least one ionic group include diamines, diols and dithiols. Of these diamines and especially diols are preferred.

The isocyanate reactive compounds in component iii) preferably have from 1 to 5, especially from 1 to 3, more especially 1 or 2 and most especially one ionic group.

To introduce carboxylic acid groups dihydroxy alkanoic acids can be used especially 2,2-dimethylolacetic acid, 2,2-dimethylolpropionic acid, 2,2-dimethylolbutyric acid and 2,2-dimethylolpentanic acid. Of these 2,2-dimethylolpropionic acid is preferred.

To introduce sulfonic acid groups bis(2-hydroxyethyl)-5-sodiosulphoisophthalate can be used.

To introduce phosphonic acid groups bis(2-hydroxyethyl) amino methylphosphonic acid can be used.

In one case, only the compounds in component iii) have any ionic groups.

It is possible to use mixtures of two or more different isocyanate reactive compound having at least one ionic group in component iii).

Optional Isocyanate Reactive Compound

It is possible that the polymer is prepared by reacting components i) to iii) and component iv) which is an isocyanate reactive compound having no ionic groups.

The isocyanate reactive compounds having no ionic groups preferably have two groups selected from hydroxyl, thiol, amino and hydrazo ($HN_2$—NH—) groups. Of these dihydrazos, diamines and diols are preferred.

Preferred diols having no ionic groups include ethyleneglycol, 1,2- and 1,3-propyleneglycol, 1,2-; 1,3-; 1,4-; and 2,3-butylene glycols, 1,6-hexanediol and neopentyl glycol, 1,8-octanediol, bis-phenol A, cyclohexane diol, diethylene glycol, triethylene glycol, tetraethylene glycol, polyethylene glycol, dipropylene glycol, polypropylene glycol, dibutyleneglycol and the like. Of these ethylene glycol is especially preferred.

Preferred diamines having no ionic groups include ethylene diamine, 1,2- and 1,3-propane diamine, 1,4-butane diamine, 1,5-pentane diamine, 1,6-hexane diamine, isophorone diamine, cyclohexane diamine, piperaine, 4,4'-methylene bis(cyclohexyl amine) and polyoxyalkylene diamines for example those sold under the Jeffamine™ tradename.

Preferred dihydrazos having no ionic groups include hydrazine and adipic acid dihydrazide.

Preferred Absence of Chromophores

Preferably, no component used in the synthetic preparation of the polymer is or contains a choromophore. More preferably none of the reaction steps is performed in the presence of a chromophore. Chromophore are highly coloured materials e.g. dyes. In this way colourless polymers may be prepared which contain no chromophore groups in their structure.

Groups in the Final Polymer

We have found that the presence of certain groups in the final polymer tends to reduce the final optical density achievable when the polymer is used to prepare a pigment-based ink. Groups of this kind include poly(ethyleneoxy) and polyester groups. Preferably to obtain the best possible optical density, the final polymer has no such groups.

More preferably component iii) and when present component iv) contain no compound which is or has such groups. Thus it is especially preferred that none of the compounds in components iii) and when present component iv) comprises poly(ethyleneoxy) or polyester groups. For example the compounds in component iii) and when present component iv) should not include alcohols, amines or thiols having poly(ethyleneneoxy) or polyester groups.

It is possible that small proportions of isocyanate reactive compounds in component iii) and when present component iv) have one or three or more isocyanate reactive groups. Preferably, the content of such isocyanate reactive compounds having one or three or more isocyanate reactive groups in component iii) and when present component iv) is relatively low (e.g. less than 5 wt % of all isocyanates present) so as not to make the pre-polymer molecular weight too low or make the pre-polymer too branched or gelled.

Preferred Absence of Certain Groups

Preferably, no compound in any of the components i) and ii) has any ionic groups.

Reaction Conditions for Components

The reaction between components is preferably performed in a liquid medium. Preferably, the liquid medium is a good solvent for all the components.

Preferred liquid media for the reaction of the components include 2-pyrrolidone, n-methyl pyrrolidone and sulfolane. The reaction temperature is preferably from 50 to 150° C., more preferably from 70 to 120° C. and especially from 80 to 110° C. The time for the reaction depends on the components used and the presence of catalyst but suitable reaction times are from 1 to 48 hours, more preferably from 2 to 24 hours and especially from 4 to 24 hours. Any suitable catalyst which is used in the preparation of polyurethanes may be used. Preferred examples of catalysts are tin salts and hindered amines.

Optional Purification

The final polymer prepared by the process according to the present invention may be used directly. It may also be purified to remove impurities from the polymer. Examples of suitable purification methods include filtration and washing and especially ultrafiltration.

Preferred Polymer Characteristics

The final polymer preferably has from 0.1 to 10 mmoles, more preferably from 0.5 to 8 mmoles, even more preferably from 0.5 to 5 mmoles and especially from 1 to 3 mmoles of ionic groups per g of polymer. The preferred method of establishing this is by titrimetry, especially potentiometric titration.

Preferably, the final polymer has a weight averaged molecular weight of from 1,000 to 500,000, more preferably from 5,000 to 200,000 and especially from 10,000 to 100,000.

The molecular weight is preferably measured by gel permeation chromatography (GPC). The molecular weight standards employed are preferably polyethylene glycol or more preferably polystyrene. The solvent used for GPC is preferably dimethyl formamide, tetrahydrofuran or acetone.

Preferably, the polymer is soluble in water. More preferably the polymer is soluble in water at 5% by weight when neutralised to 100% stoichiometry with lithium hydroxide. Preferably, the polymer is soluble at 25° C.

The final polymer preferably has anionic groups as previously mentioned and preferred in the section headed Component iii). In the case of the final polymer the anionic groups may be in the acid or more preferably in the salt form. The preferred salt forms are those previously mentioned in the section headed Component iii). A suitable method for preparing these salts is by the addition of a base such as ammonia, an organic amine, an organic alkanolamine or an alkali metal hydroxide. The addition of base is preferably performed after reacting components i) to iii) in the process as defined in the first aspect of the present invention.

Polymer obtained or Obtainable by the Process

According to a second aspect of the present invention there is provided a polymer obtained or obtainable by the process according to the first aspect of the present invention.

Preferably, the polymer is linear. Preferably, the polymer has a structure wherein the only ionic groups present were introduced from component iii).

Dispersion

According to a third aspect of the present invention there is provided a dispersion comprising a polymer according to the second aspect of the present invention, a particulate solid and a liquid vehicle.

The particulate solid in the dispersion preferably has a Z-averaged particle size of from 50 to 300 nm, more preferably from 70 to 200 nm and especially from 80 to 150 nm. The particle size is preferably measured by a light scattering device especially a Malvern Zetasizer™.

Preferably, the dispersion comprises:
i) 0.1 to 40 parts, more preferably 0.1 to 20 parts of the polymer;
ii) 0.1 to 40 parts, more preferably 0.1 to 20 parts of the particulate solid;
iii) 50 to 99.8, more preferably 60 to 99.8 parts of the liquid vehicle;
wherein the sum of the parts i) to iii) is 100 parts and all parts are by weight.

Preferably, the polymer is at least partially adsorbed onto the surface of the particulate solid. In this way the polymer acts as a dispersant so as to colloidally stabilise the particulate solid.

The amount of polymer in the dispersion (or ink) is preferably from 1 to 150%, more preferably from 1 to 40%, especially from 1 to 30% and more especially from 3 to 20% by weight based on the weight of particulate solid.

A preferred method for preparing the dispersions according to the third aspect of the present invention is to disperse, especially to comminute, a composition comprising the polymer according to the second aspect of the present invention, a particulate solid and a liquid vehicle. Dispersion processes include stirring, blending, shaking as well as milling and ultrasonication etc.

By the word comminute we mean only those processes which tend to significantly reduce the particle size of the particulate solid. Comminution includes for example ultrasonication, bead milling, microfluidizing and high pressure homogenising. Comminution does not include low shear dispersion processes such as stirring, shaking, tumbling and the like. Preferably, the polymer according to the second aspect of the present invention is the only dispersant present during the dispersion or comminution step.

Particulate Solid

The particulate solid may be of any kind. Preferably the particulate solid is a pigment. The pigment may comprise and preferably is an inorganic or organic pigment material or mixture thereof which is insoluble in the liquid vehicle. By insoluble we mean having a solubility of no more than 1%, more preferably no more than 0.1% by weight in the liquid vehicle. The solubility is preferably measured at a temperature of 25° C. The solubility is preferably measured at a pH of 8. Preferably, the solubility is measured in water, more preferably deionized water.

The pigment may be organic or inorganic.

A preferred pigment is an organic pigment, for example any of the classes of pigments described in the Third Edition of the Colour Index (1971) and subsequent revisions of, and supplements thereto, under the chapter headed "Pigments". Examples of organic pigments are those from the azo (including disazo and condensed azo), thioindigo, indanthrone, isoindanthrone, anthanthrone, anthraquinone, isodibenzanthrone, triphendioxazine, quinacridone and phthalocyanine series, especially copper phthalocyanine and its nuclear halogenated derivatives, and also lakes of acid, basic and mordant dyes. Preferred organic pigments are phthalocyanines, especially copper phthalocyanine pigments, azo pigments, indanthrones, anthanthrones, and quinacridones.

Preferred inorganic pigments include carbon black (especially gas blacks), titanium dioxide, silicon dioxide, aluminium oxide, iron oxides and sulfides.

For ink jet especially suitable pigments are carbon blacks, C.I. Pigment Red 122, C.I. Pigment Blue 15:3 and C.I. Pigment Yellow 74. Of course there are many alternative pigments.

The pigment is preferably not surface treated so as to covalently bind water-dispersing groups onto its surface. Preferably, the pigment is not dispersible in water without the aid of a dispersant.

Liquid Vehicle for the Dispersion

The liquid vehicle may be wholly organic but preferably is or comprises water (i.e. is aqueous). We have found that the polymer according to the second aspect of the present invention is especially suitable as a dispersant for aqueous liquid vehicles.

In some cases, the liquid vehicle comprises water and optionally one or more water-miscible organic liquids. In some instances it is preferred that the liquid vehicle comprises water and less than 30% by weight, more preferably less than 20% by weight and especially less than 10% by weight of water-miscible organic liquids relative to the total amount of liquids present in the dispersion. In some cases the liquid vehicle for the dispersion comprises of water and no organic liquid. These dispersions facilitate more formulation options.

Preferred water-miscible organic liquids for inclusion into the liquid vehicle include:
i) $C_{1-6}$-alkanols, preferably methanol, ethanol, n-propanol, isopropanol, n-butanol, sec-butanol, tert-butanol, n-pentanol, cyclopentanol and cyclohexanol;
ii) linear amides, preferably dimethylformamide or dimethylacetamide;
iii) water-miscible ethers, preferably tetrahydrofuran and dioxane;
iv) diols, preferably diols having from 2 to 12 carbon atoms, for example ethylene glycol, propylene glycol, butylene glycol, pentylene glycol, hexylene glycol and thiodiglycol and oligo- and poly-alkyleneglycols, preferably diethylene glycol, triethylene glycol, polyethylene glycol and polypropylene glycol;
v) triols, preferably glycerol and 1,2,6-hexanetriol;
vi) mono-$C_{1-4}$-alkyl ethers of diols, preferably mono-$C_{1-4}$-alkyl ethers of diols having 2 to 12 carbon atoms, especially 2-methoxyethanol, 2-(2-methoxyethoxy)ethanol, 2-(2-ethoxyethoxy)-ethanol, 2-[2-(2-methoxyethoxy)ethoxy]ethanol, 2-[2-(2-ethoxyethoxy)-ethoxy]-ethanol and ethyleneglycol monoallylether;
vii) cyclic amides, preferably 2-pyrrolidone, N-methyl-2-pyrrolidone, N-ethyl-2-pyrrolidone, caprolactam and 1,3-dimethylimidazolidone.

Preferably, the liquid vehicle comprises water and optionally 1 or more, especially optionally from 1 to 3, water-miscible organic liquids.

Encapsulated Particulate Solids

The dispersions according to the third aspect of the present invention can be used to prepared encapsulated particulate solids. To form an encapsulated particulate solid the polymer in the dispersion is cross-linked in the presence of a particulate solid and a liquid vehicle thereby encapsulating the solid particles, preferably with a cross-linked polymer shell.

The particulate solid is preferably a pigment as mentioned and preferred above. The liquid vehicle is preferably as mentioned above in the section headed liquid vehicle for the dispersion.

The cross-linking can be achieved by using a self cross-linking polymer. More preferably, a cross-linking agent is used to cross-link the polymer. Examples of suitable combinations of cross-linkable groups in the polymer and cross-linking groups in the cross-linking agent are listed in WO 2005/061087 at page 6, Table 1. Of these it is preferred that the cross-linkable group in the polymer is an ionic group especially a —$CO_2H$ group and/or a phosphorus containing acid group or salt thereof. For these cross-linking groups the cross-linking agent is preferably selected from melamines, carbodiimides, oxetanes, isocyanates, aziridines and especially epoxides. Preferably, cross-linking is effected by means of an epoxy cross-linking agent.

Especially suitable encapsulation and cross-linking chemistry can be found in PCT patent publication WO2006/064193.

We have found that the encapsulated particulate solids tend to have even better colloidal stability towards liquid vehicles which comprise water and relatively high proportions of water-miscible organic liquids.

Ink

Inks preferably comprise at least one colorant such as a dye or a pigment. Preferably, in inks the particulate solid is a pigment. Preferably, no other colorant is present in the ink.

Preferably, the ink (especially an ink jet printing ink) comprises a dispersion according to the third aspect of the present invention.

According to a fourth aspect of the present invention there is provided an ink comprising a dispersion according to the third aspect of the present invention wherein the particulate solid is a pigment.

Preferably, the ink is an ink jet printing ink.

Preferably, the ink has a viscosity of less than 30 mPa·s, more preferably less than 20 mPa·s and especially less than 10 mPa·s. The viscosity is preferably at least 2 mPa·s. Preferably, the viscosity is Newtonian. Preferably, the viscosity is measured at 25° C. Preferably, the viscosity is measured using a shear rate of 100 s$^{-1}$. The viscosity is preferably measured using a cone and plate geometry. A preferred apparatus for measuring the viscosity is a TA Instruments rheometer.

Preferably, the ink comprises:
i) 0.1 to 10 parts, more preferably from 1 to 10 parts of polymer according to the second aspect of the present invention;
ii) 0.1 to 10 parts, more preferably from 1 to 10 parts of a pigment;
iii) 80 to 99.8 parts, more preferably 80 to 98 parts of a liquid vehicle wherein all parts are by weight.

The ratio of polymer to pigment is as hereinbefore preferred. Preferably, the ink has a surface tension of 20 to 65 dynes/cm, more preferably 30 to 60 dynes/cm, when measured at a temperature of 25° C. The surface tension is preferably measured using a Kibron AquaPi.

The pH of the ink is preferably from 4 to 11, more preferably from 7 to 10.

When the ink is to be used as ink jet printing ink, the ink preferably has a concentration of halide ions of less than 500 parts per million, more preferably less than 100 parts per million. It is especially preferred that the ink has less than 100, more preferably less than 50 parts per million of divalent and trivalent metals. Parts per million as used above refers to parts by weight relative to the total weight of the ink. These low concentrations of ions in the resultant ink can be achieved by the abovementioned purification step.

The ink has preferably been treated so as to remove particles having a particle size of greater than 1 micron. This may be done by centrifugation or filtration.

The ink preferably comprises a liquid vehicle which is or comprises water. More preferably the liquid vehicle also comprises at least one water-miscible organic liquid. Preferably, the weight ratio of water to water-miscible organic liquid when both are present in the liquid medium may be from 99:1 to 5:95, more preferably 95:5 to 50:50, especially 95:5 to 70:30. Preferred water-miscible organic liquids are mentioned above. These inks are especially useful for ink jet as they assist in preventing any polymer from depositing on the ink jet printer nozzles. These water miscible organic liquids also help in the firing, substrate wetting, surface tension and substrate penetration characteristics of the ink.

The ink may optionally contain one of more ink additives. Preferably, the ink further comprises one or more additives selected from viscosity modifiers, pH buffers, metal chelating agents, surfactants, corrosion inhibitors, biocides, dyes, water miscible organic solvent(s) and/or kogation reducing additives.

Ink Jet Printer Cartridge

According to a fifth aspect of the present invention there is provided an ink jet printer cartridge comprising a chamber wherein an ink is present in the chamber and the ink is according to the fourth aspect of the present invention.

Substrate

According to a sixth aspect of the present invention there is provided a substrate printed with an ink according to the fourth aspect of the present invention. The substrate may be of any kind including paper, glass, metal, material and plastic. We have found that the inks according to the fourth aspect of the present invention print onto substrates to provide prints having especially good optical density even on plain paper. The prints also demonstrate particularly good wet and dry rub-fastness.

Use of the Polymer for Dispersing

According to a seventh aspect of the present invention there is provided the_use of a polymer according to the second aspect of the present invention for dispersing (especially comminuting) a mixture comprising the polymer, the particulate solid and the liquid vehicle. The use of the polymer is especially good for dispersing and comminuting pigments. The particle size of the resulting particulate solid is preferably as mentioned above.

EXAMPLES

The present invention will now be illustrated by the following examples in which all parts are by weight unless stated to the contrary.

1. Preparation of Polymer Solution (1)

1.1 Preparation of the compound of Formula (1) [(Monomer (1)]

In step 1.1 the following compound of Formula (1a) may be prepared.

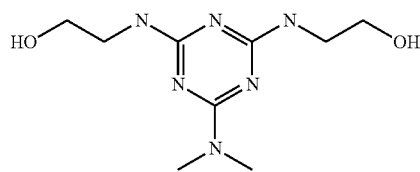

Formula (1a)

Cyanuric chloride (0.50 mol, 92.2 g) may be suspended in water (300 ml) and cooled to 0-5° C. in a reactor. A solution of ethanolamine (1.0 mol, 61.3 g) in water (50 ml) may be added dropwise to the reactor contents whilst maintaining the temperature at 0-5° C. to form a reaction mixture.

On completion of the addition the reaction mixture can be warmed to 40-45° C. and stirred at this temperature for 3 hours whilst slowly adding a solution of sodium hydroxide (1.0 mol, 40 g) in water (100 ml) to maintain the pH at 6-7.

40% Aqueous dimethylamine solution (0.50 mol, 56.3 g) may be added to the reaction mixture which can then stirred at a temperature of 70° C. and pH=9 (2M NaOH solution as required) for 8 hours and then allowed to cool to a temperature of 25° C. The product may be collected by filtration, washed with water (5×100 ml) and dried in a vacuum oven at 50° C. to give a white solid. This can be designated Monomer (1).

1.2. Preparation of Polymer Solution (1)

A mixture of the Monomer (1) as can be prepared above in step 1.1 (0.039 mol, 9.4 g), ethylene glycol (0.048 mol, 3.0 g), isophorone diisocyanate (0.273 mol, 60.7 g), 2,2 bis(hydroxymethyl) propionic acid (0.200 mol, 26.8 g) and N-methyl pyrrolidone (100 g) may be stirred and heated to 50° C. and 2 drops of tin ethylhexanoate may be added. This may form a reaction mixture. The reaction mixture can be stirred at a temperature of 95-100° C. for 18 hours.

The reaction mixture may be cooled, added to water (2000 ml) to give a solution and then can be acidified by the addition of concentrated hydrochloric acid until the pH was reduced to 3. The resultant precipitate may be collected by filtration and then suspended in water (2000 ml). The pH of the suspension may be adjusted to 9 by the addition of potassium hydroxide and then the suspension can be stirred for 1 hour.

Next the precipitate can be collected, suspended in water (500 ml) at pH=10 (KOH) and dialysed to a conductivity of less than 100 μS/cm. The dialysed solution may be concentrated under reduced pressure to give 325 g of a solution which contained the desired polymer at a concentration of 27% by weight. This can be designated Polymer Solution (1).

2. Inks

The polymers prepared in the present invention may be used to prepare dispersions of particulate solids (especially pigments) by means of comminution (e.g. milling). These dispersion may be added to ink vehicles so as to prepare a range of inks suitable for ink jet printing. Examples of preferred ink vehicles are as described in PCT patent publication WO2010/038071 at pages 28 to 30. Thus suitable ink jet printing inks can be prepared by substituting the mill-base in WO2010/038071 for analogous mill-bases using the polymer as prepared in the present invention.

The invention claimed is:

1. A process for preparing a polymer comprising reacting at least the components i) to iii) in any order:

i) a compound of the Formula (1):

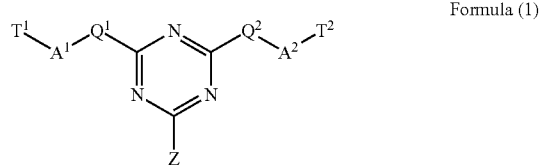

Formula (1)

wherein:
T$^1$ and T$^2$ independently are HO—, HS— or R$^1$HN—;
Q$^1$ and Q$^2$ independently are —NR$^2$—;
A$^1$ and A$^2$ independently are an optionally substituted divalent organic linking group;
R$^1$ when present is H or an optionally substituted alkyl, aryl or heterocyclyl group;
R$^2$ is H or an optionally substituted alkyl, aryl or heterocyclyl group;
Z is an HO— group or a group of the Formula (2) or (3);

(*)-L-X     Formula (2)

wherein:
L is —HN—, —O— or —S—;
X is an optionally substituted organic group;

Formula (3)

wherein:
each X independently is an optionally substituted organic group;
in both Formulae (2) and (3) the asterisk (*) signifies the point of attachment to the triazine ring:

ii) a diisocyanate;

iii) an isocyanate reactive compound having at least one ionic group.

2. The process according to claim 1 where the ionic group is a carboxylic acid group, the isocyanate reactive compound has two groups selected from hydroxyl, thiol, amino and hydrazo groups and the ionic group is selected from phosphorus containing acid, sulfonic acid and carboxylic acid groups.

3. A process according to claim 1 wherein the ionic group is a carboxylic acid group, the isocyanate reactive compound having at least one ionic group is a dihdroxy alkanoic acid and the isocyanate reactive compound having at least one ionic group is 2,2-dimethylolpropionic acid.

4. The process according to claim 1 wherein $T^1$ and $T^2$ are HO—.

5. The process according to claim 1 wherein $A^1$ and $A^2$ are independently selected from —$(CH_2)_{1-20}$— groups.

6. The process according to claim 1 wherein the diisocyanate is selected from ethylene diisocyanate, 1,6-hexamethylene diisocyanate, tetramethylxylene diisocyanate, 1,4-phenylene diisocyanate, 2,4-toluene diisocyanate, 2,6-toluene diisocyanate, 4,4'-diphenyl-methane diisocyanate and its hydrogenated derivative, 2,4'-diphenylmethane diisocyanate and its hydrogenated derivative, 1,5-naphthylene diisocyanate and isophorone diisocyanate.

7. The process according to claim 1 resulting in a polymer having a weight averaged molecular weight of from 1,000 to 500,000.

8. The process according to claim 1 wherein the resulting polymer has from 0.5 to 8 mmoles of ionic groups per g of polymer.

9. The process according to claim 1 wherein Z is of the Formulae (2) or (3).

10. A process according to claim 1 wherein the isocyanate reactive compound has two groups selected from hydroxyl, thiol, amino and hydrazo groups, the ionic group is selected from phosphorus containing acid, sulfonic acid and carboxylic acid groups, $T^1$ and $T^2$ are HO—, $A^1$ and $A^2$ are independently selected from —$(CH_2)_{1-20}$— groups, Z is of the Formula (2) or (3), the resulting polymer has a weight averaged molecular weight of from 1,000 to 500,000 and the resulting polymer has from 0.5 to 8 mmoles of ionic groups per g of polymer.

11. A polymer obtained by the process according to claim 1.

12. A dispersion comprising a polymer according to claim 11, a particulate solid and a liquid vehicle.

13. The dispersion according to claim 12 comprising:
    i) 0.1 to 40 parts of the polymer;
    ii) 0.1 to 40 parts of the particulate solid;
    iii) 50 to 99.8 parts of the liquid vehicle;
    wherein the sum of the parts i) to iii) is 100 parts and all parts are by weight.

14. The dispersion according to claim 12 wherein the polymer has been cross-linked in the presence of the particulate solid and the liquid vehicle thereby encapsulating the solid particles.

15. An ink comprising a dispersion according to claim 12 wherein the particulate solid is a pigment.

16. An ink jet printer cartridge comprising a chamber wherein an ink is present in the chamber and the ink is according to claim 15.

17. A polymer obtained by the process according to claim 10.

18. A dispersion comprising a polymer according to claim 17, a particulate solid and a liquid vehicle.

19. The dispersion according to claim 18 comprising:
    i) 0.1 to 40 parts of the polymer;
    ii) 0.1 to 40 parts of the particulate solid;
    iii) 50 to 99.8 parts of the liquid vehicle;
    wherein the sum of the parts i) to iii) is 100 parts and all parts are by weight.

20. The dispersion according to claim 19 wherein the polymer has been cross-linked in the presence of the particulate solid and the liquid vehicle thereby encapsulating the solid particles.

21. An ink comprising a dispersion according to claim 18 wherein the particulate solid is a pigment.

22. An ink jet printer cartridge comprising a chamber wherein an ink is present in the chamber and the ink is according to claim 21.

* * * * *